United States Patent [19]
Zakrocki et al.

[11] Patent Number: 5,973,428
[45] Date of Patent: Oct. 26, 1999

[54] STATOR MOUNTING METHOD AND APPARATUS FOR A MOTOR

[75] Inventors: Jerzy Zakrocki, Mesa; Michael H. Brown, Chandler, both of Ariz.

[73] Assignee: NMB U.S.A. Inc., Chatsworth, Calif.

[21] Appl. No.: 09/119,221

[22] Filed: Jul. 20, 1998

[51] Int. Cl.⁶ ..................................................... H02K 11/00
[52] U.S. Cl. ........................ 310/71; 310/67 R; 310/68 R; 310/259; 310/91; 310/258; 310/217; 310/218
[58] Field of Search ..................................... 310/71, 67 R, 310/68 R, 259, 91, 255, 217, 218

[56] References Cited

U.S. PATENT DOCUMENTS

| | | | |
|---|---|---|---|
| 5,616,975 | 4/1997 | May et al. | 310/89 |
| 5,635,781 | 6/1997 | Moritan | 310/71 |

*Primary Examiner*—Nestor Ramirez
*Assistant Examiner*—Thanh Lam
*Attorney, Agent, or Firm*—Amster, Rothstein & Ebenstein

[57] ABSTRACT

A stator assembly for an axial-flow fan motor for cooling electronic components consisting of a base, a stator, and insulating pins for connecting the base to the stator. The stator consists of a core covered by an insulating coating and a winding formed thereon from magnet wire. The stator also includes mounting holes formed in the core. The winding is electrically connected to the base through free ends of the magnet wire forming the winding. Each insulating pin has a first conductive end which is mounted to the base and a second non-conductive end which is received in one of the mounting holes on the stator. In the preferred embodiment, the base consists of a printed circuit board which includes circuitry for operating the motor within which the stator assembly is mounted. The method of securing the stator to the base is also disclosed.

9 Claims, 5 Drawing Sheets

STATOR MOUNTING METHOD AND APPARATUS FOR A MOTOR

FIELD OF THE INVENTION

The present invention relates to a motor, and especially relates to a method and apparatus for mounting, insulating and electrically connecting the stator assembly within the motor.

BACKGROUND OF THE INVENTION

With the continual increase in the density and load-carrying capability of electronic components on circuit boards, and the consequent increase in heating problems resulting therefrom, axial-flow fans are increasingly being used in an effort to combat such heating problems. During the design of such axial-flow fans, it is important to make them as small and as cost-effective as possible. In particular, it is important to reduce the width of such a fan as much as possible.

Various structures have been used to mount and insulate the stator assembly within a motor, and more particularly, within an axial-flow fan motor. For example, in U.S. Pat. No. 5,264,748, a two-part insulator section is placed over the stator core, and the windings are wound over the insulator section. Pins secured to the insulator section are used to mount the stator on a printed circuit board assembly. The pins are also used to electrically connect the windings to the circuit board. However, the insulator section and the windings add bulk to the stator assembly, causing the motor to be wider than optimal for use in axial-flow fans for cooling electronic components. The use of the insulator section also adds cost to the assembly.

In another structure, a two-part insulator section is attached to the stator core, with the windings wound over the insulator section, in a manner similar to that shown in U.S. Pat. No. 5,264,748. However, instead of using pins to secure the stator assembly to the printed circuit board, the lower part of the insulator section includes legs which protrude below the stator assembly and the legs include means for attachment to the printed circuit board. In this structure, the lead wires for the stator windings are fed through a channel in the legs to the circuit board for connection thereto. Here again, the use of an insulator section between the windings and the core where the insulator section also attaches the stator assembly to the printed circuit boards causes the motor to be wider than optimal and adds cost to the stator assembly.

SUMMARY OF THE INVENTION

Accordingly, it is an object of this invention to provide a means and method for attaching a stator assembly to a base or a printed circuit board in an axial-flow fan motor without the use of a separate insulator section between the stator core and the windings.

An additional object is to provide a means and method for attaching a stator assembly to a base or a printed circuit board in an axial-flow fan motor which reduces the width of the motor.

Yet another object is to provide a means and method for attaching a stator assembly to a base or a printed circuit board in an axial-flow fan motor which reduces the cost of the motor.

These and other objects are realized by a stator assembly for a motor, comprising a base for a motor, the base having at least one electrical terminal; a stator comprising a core having at least one mounting hole, and at least one winding having at least one end for electrical connection to the base; and at least one insulating pin for securing the stator to the base, the at least one insulating pin having a first conductive end and a second non-conductive end, the first conductive end of the insulating pin mounted to the at least one electrical terminal and the second non-conductive end of the insulating pin received in the at least one mounting hole.

In a preferred embodiment, the base is a printed circuit board which includes circuitry for operating the motor within which the assembly is mounted.

Additionally, in a preferred embodiment, the stator core is coated with an insulating material.

The invention further contemplates the pin for securing a stator and a method of securing a stator to a base. The method includes the step of coating the stator core with an insulating material.

BRIEF DESCRIPTION OF THE DRAWINGS

The above and related objects, features and advantages of the present invention will be more fully understood by reference to the following detailed description of the presently preferred, albeit illustrative, embodiments of the present invention when taken in conjunction with the accompanying drawings wherein.

DETAILED DESCRIPTION OF THE PREFERRED EMBODIMENTS

Figure 1:
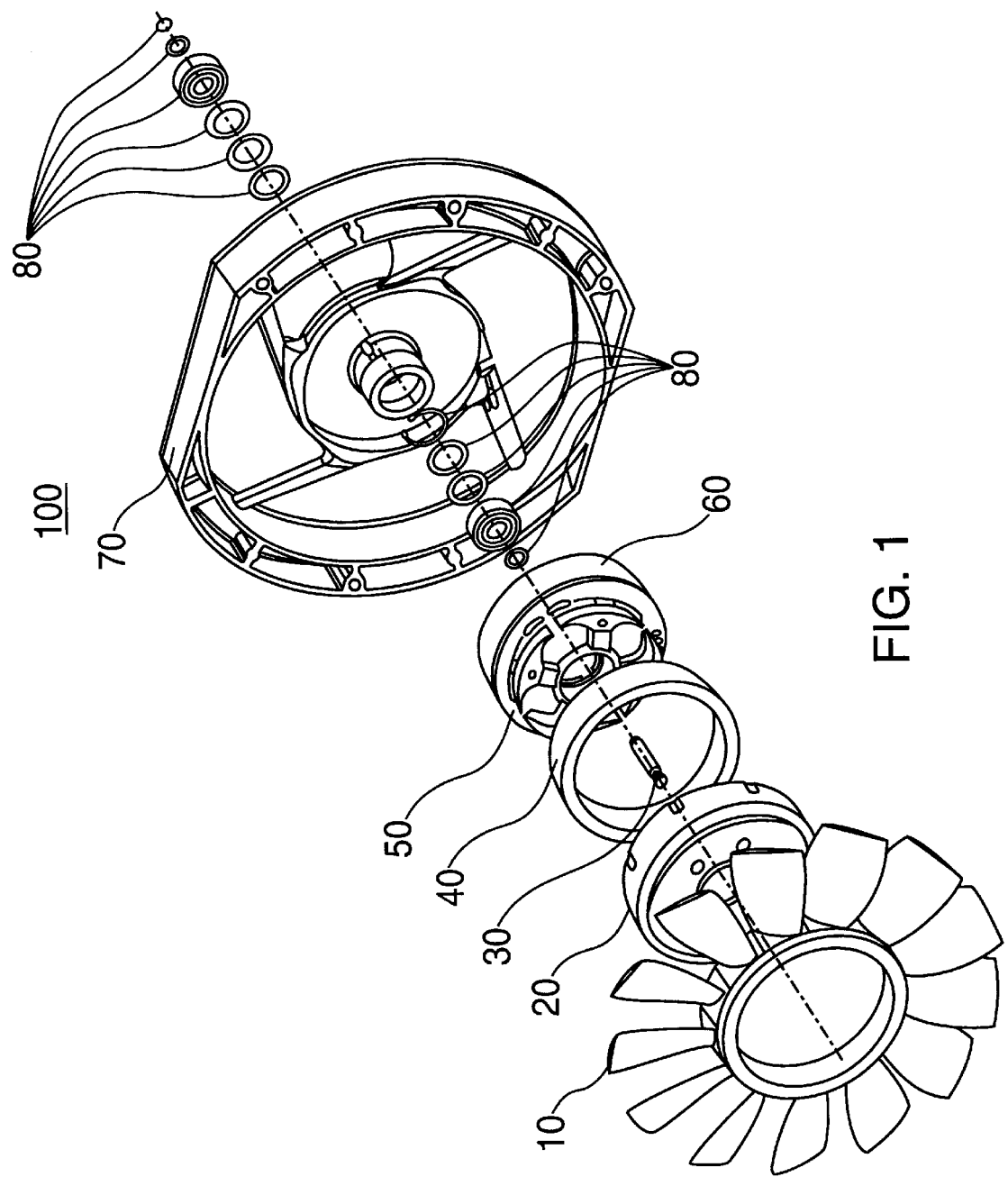
FIG. 1 is an exploded perspective view of an axial-flow fan embodying the invention.
Figure 2:
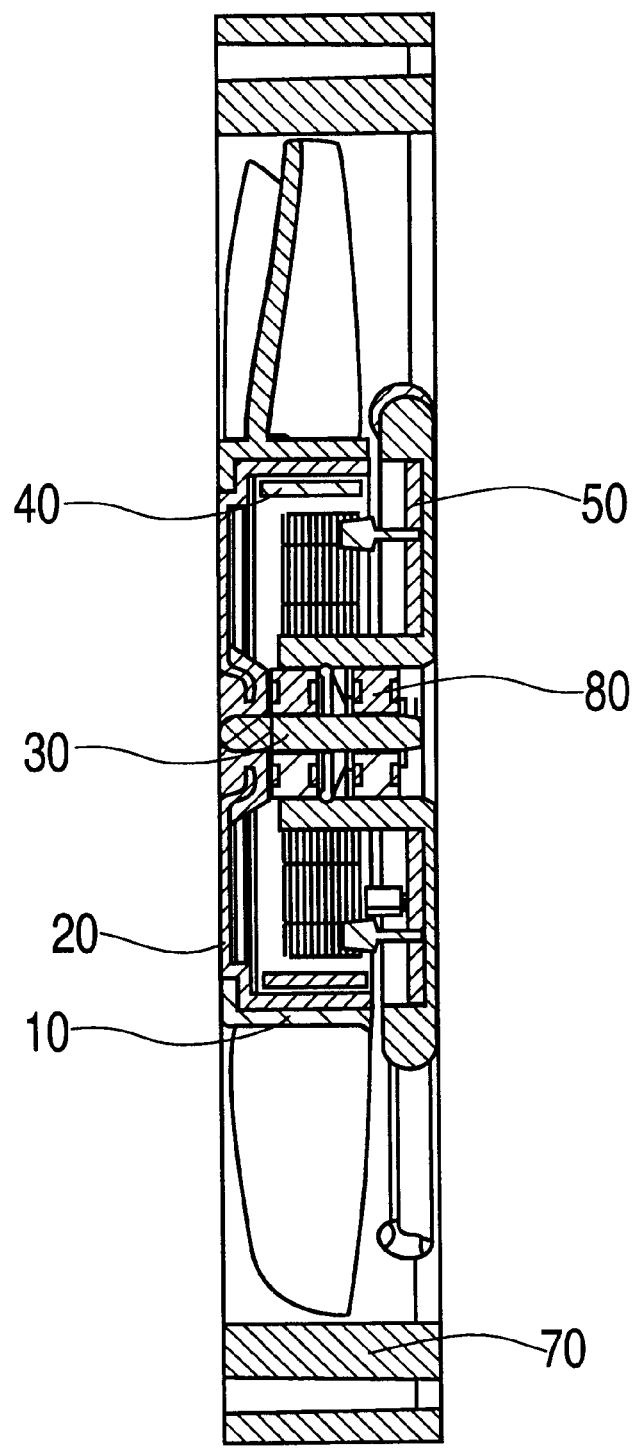
FIG. 2 is a cross-sectional assembled view thereof.

Referring now to the drawings, and in particular to FIGS. 1 and 2, wherein illustrated is an axial-flow fan 100, comprising an impeller 10 for generating airflow when rotated, a yoke 20 mounted in impeller 10, a shaft 30 coupled to yoke 20, a permanent magnet 40 mounted in yoke 20, a stator assembly 50 embodying the preferred embodiment of the present invention, a fan housing 70, an insulation sheet 60 for electrically insulating the base within stator assembly 50 discussed further below from fan housing 70, and bearings and mounting hardware 80 which serve to secure the shaft 20 to housing 70 while allowing shaft 20 to freely rotate, thereby rotating impeller 10. The permanent magnet 40 mounted in yoke 20, when combined with stator assembly 50, forms an electrical motor which turns impeller 10 when a voltage is applied to an exciting circuit on the printed circuit board within stator assembly 50. The construction of impeller 10 and other features of the axial-flow fan 100 including the printed circuit board are fully described in a co-pending patent application filed concurrently herewith and owned by the assignee of this application, which is incorporated herein by reference entitled "Axial Flow Fan".

Figure 3:
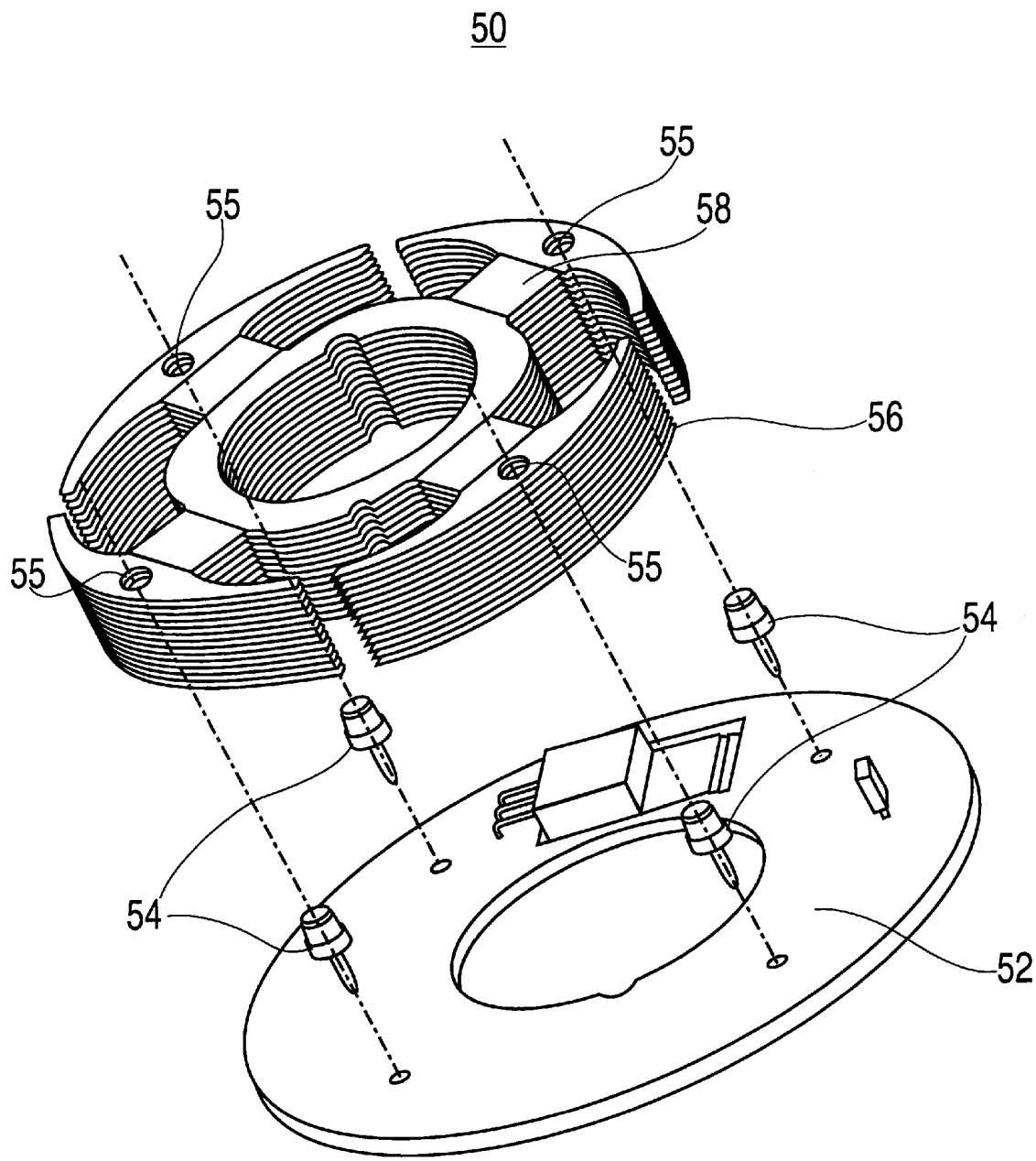
FIG. 3 is an exploded perspective view of the present invention.
Figure 4:
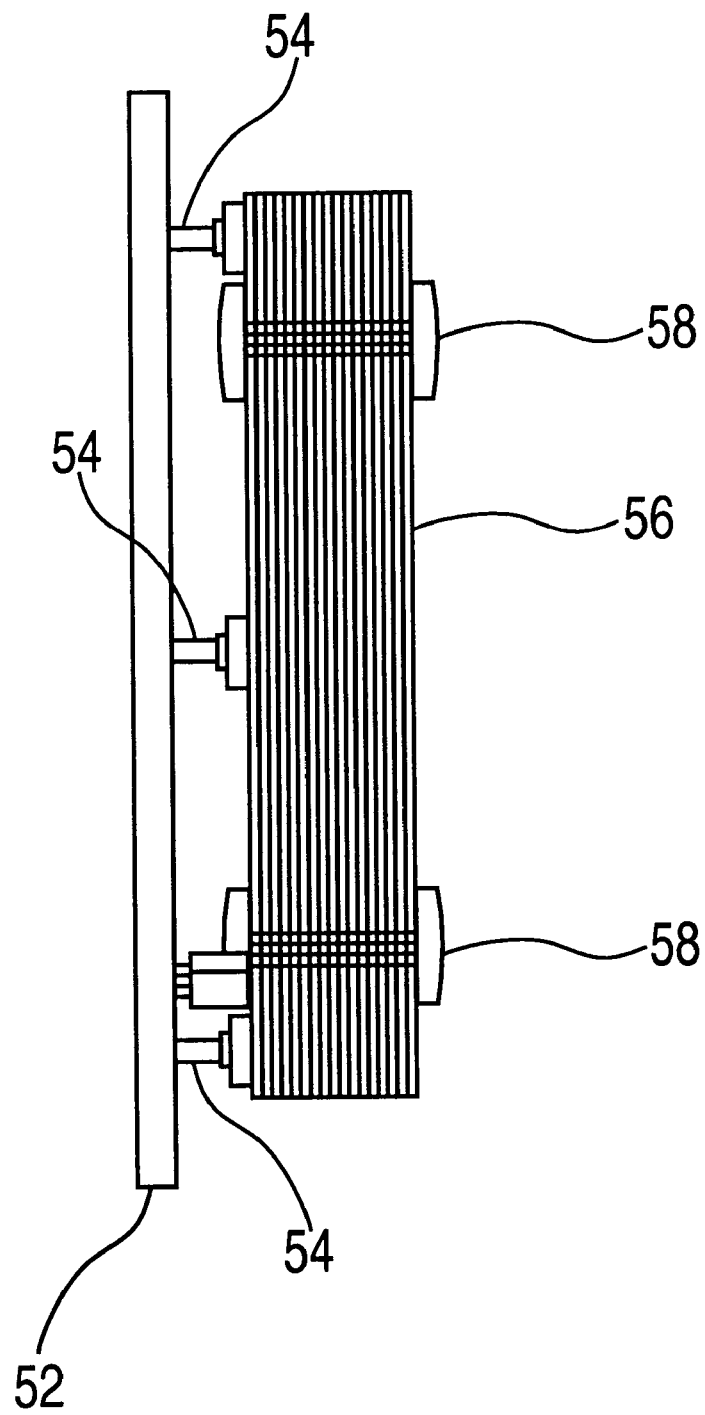
FIG. 4 is a cross-sectional assembled view thereof.
Figure 5:
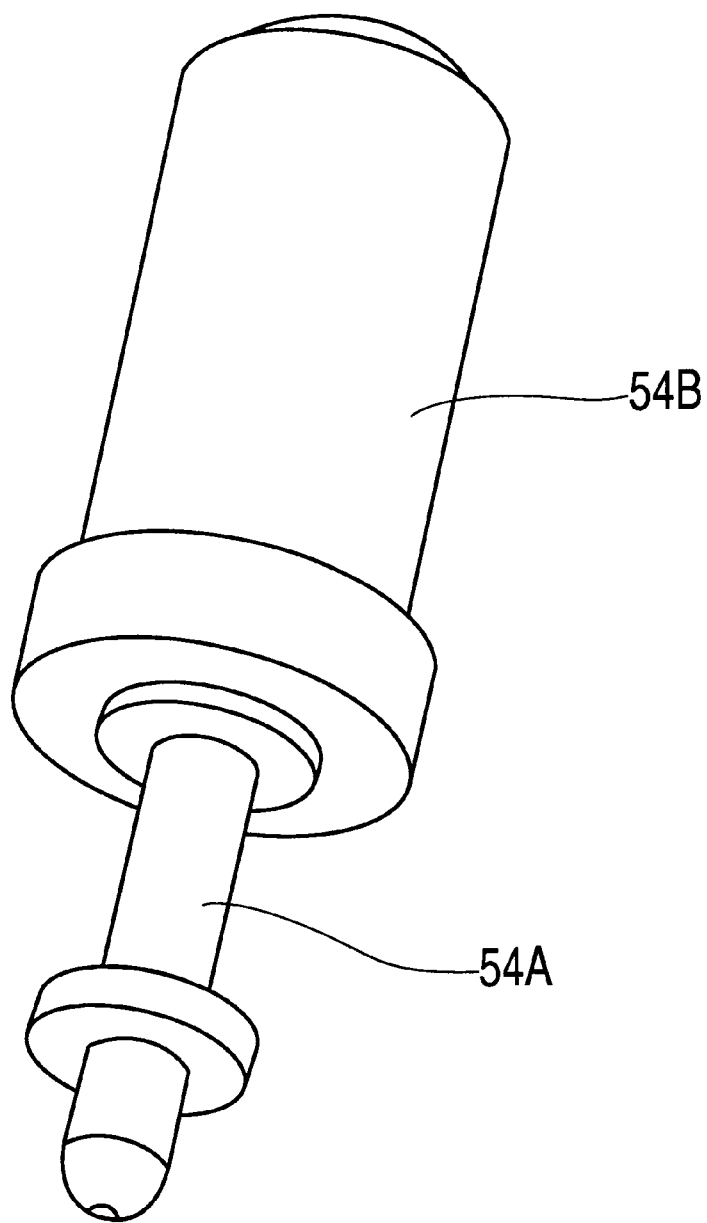
FIG. 5 is a perspective view of an insulating pin in accordance with the invention.

FIGS. 3 and 4 depict the stator assembly 50, comprising a base 52, four insulating pins 54, a stator core 56 and windings 58. In the preferred embodiment, base 52 is a printed circuit board including the circuitry for exciting and operating the motor. The stator core 56 is formed from a lamination of iron parts and is coated with a thin layer of insulating material to insulate the stator core 56 from the magnet wire that forms the windings 58. The stator core 56 also includes four mounting holes 55 in the preferred embodiment. In the preferred embodiment of the present invention, the stator core is fluidized with 3M® Scotucast Resin 5133 to obtain an insulating coating that is approximately 0.005" thick before the windings are formed thereon. As shown in FIG. 5, each insulating pin 54 includes a first end 54A which is metallic, and thus electrically conductive, which is secured to the base 52, for example by soldering, thereby forming an electrical connection therewith, and a second end 54B which is non-metallic and thus electrically non-conductive (i.e. an insulator). In the preferred embodiment, the non-conductive end 54B of insulating pin 54 is formed from Teflon®.

The stator core 56 is secured to base 52 by inserting the second end 54B of each of the insulating pins 54 into a corresponding mounting hole 55 in stator core 56. In the preferred embodiment, the connection between the insulating pin 54 and the stator core 56 is press-fit, although one reasonably skilled in the art will readily recognize that other methods may be used to secure insulating pin 54 to stator core 56, including but not limited to the use of a suitable adhesive. In the preferred embodiment, once the stator core 56 is secured to the insulating pins 54 mounted on base 52, the free ends of the magnet wire forming the windings 58 on stator core 56 are electrically connected to the conductive portion of insulating pins 54, for example by soldering. As one reasonably skilled in the art will readily recognize, the free ends of the magnet wire could also be electrically connected directly to base 52.

As a result of coating the stator core 56 with a extremely thin layer of an insulating material and using insulating pins 54 to attach the stator core 56 to base 52, instead of using a two-part insulator section mounted directly on the stator core, an axial-flow fan motor having a width 50% smaller than conventional axial-flow fan motors has been constructed.

To summarize, the present invention provides a means and method for attaching a stator assembly to a printed circuit board in an axial-flow fan motor without the use of a separate insulator section between the stator core and the windings. In addition, an axial-flow fan motor embodying the present invention has a smaller width and reduced cost.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

We claim:

1. A stator assembly for a motor, comprising:

a base having at least one electrical terminal;

a stator comprising a core having at least one mounting hole, and at least one winding having at least one end for electrical connection to said base; and at least one insulating pin for rigidly securing said stator to said base, said at least one insulating pin having a first conductive end and a second non-conductive end, said first conductive end of said insulating pin mounted to said at least one electrical terminal and said second non-conductive end of said insulating pin affixed in said at least one mounting holes, whereby said at least one insulating pin mounted in said base provides the only rigid mechanical support of said stator in the motor.

2. The stator assembly of claim 1, wherein said at least one end of said at least one winding is electrically connected to said base via said conductive end of said at least one insulating pin.

3. The stator assembly of claim 1, wherein said at least one end of said at least one winding is electrically connected directly to said base.

4. The stator assembly of claim 1, wherein said core is coated with an insulating material.

5. The stator assembly of claim 1, wherein said base for said motor comprises a circuit board for mounting circuitry for operating said motor.

6. The stator assembly of claim 5, wherein said circuit board is a printed circuit board.

7. The stator assembly of claim 1, wherein said stator assembly is for use in an axial-flow fan motor.

8. A method of securing a stator within a motor, comprising the steps of:

coating a stator core with an insulating material;

placing at least one winding on said stator core over said insulating material;

affixing a first conductive end of at least one insulating pin to an electrical terminal in a base;

electrically connecting said at least winding on said stator coil to said first conductive end of said at least one insulating pin;

affixing a second non-conductive end of said at least one insulating pin to a mounting hole in said stator; and whereby said at least one insulating pin affixed in said base provides the only rigid mechanical support of said stator in the motor.

9. A stator assembly for a motor, consisting essentially of:

a base for providing mechanical support and having at least one electrical terminal;

a stator comprising a core having at least one mounting hole, and at least one winding having at least one end for electrical connection to said base;

at least one insulating pin for rigidly securing said stator to said base, said at least one insulating pin having a first conductive end and a second non-conductive end, said first conductive end of said insulating pin mounted to said at least one electrical terminal and said second non-conductive end of said insulating pin affixed in said at least one mounting hole.

* * * * *